Nov. 13, 1956 A. NOVICK 2,770,176
METHOD AND APPARATUS FOR MAKING OPEN SIDE ENVELOPES
Filed Oct. 25, 1952 10 Sheets-Sheet 1

INVENTOR.
Abraham Novick
BY
Moses, Nolte, Crews & Berry
ATTORNEYS

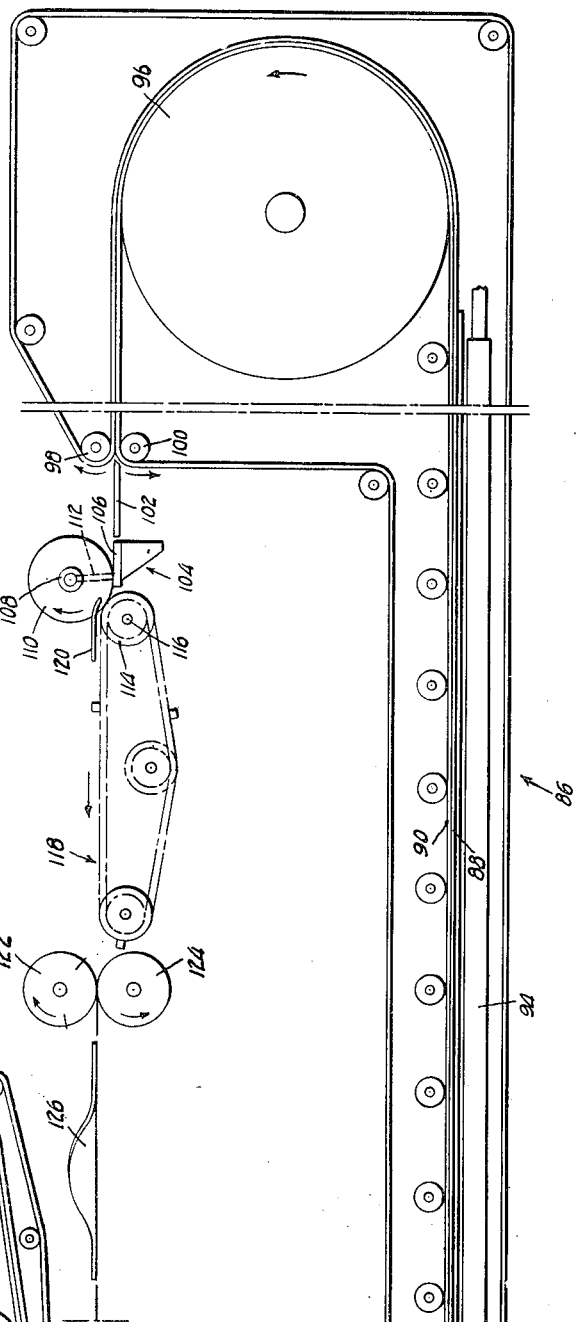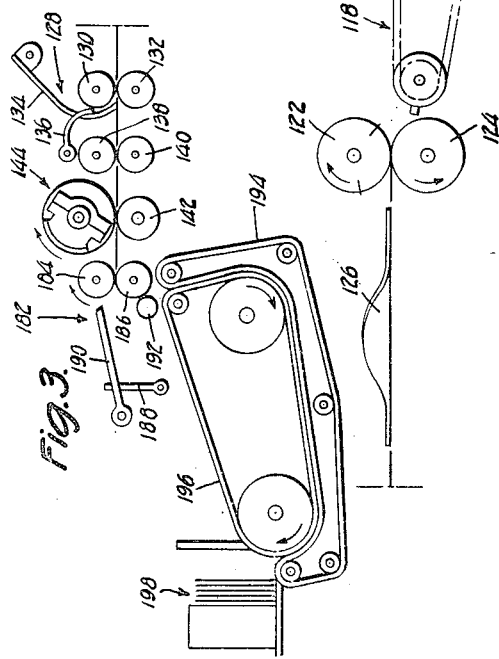

Nov. 13, 1956          A. NOVICK          2,770,176
METHOD AND APPARATUS FOR MAKING OPEN SIDE ENVELOPES
Filed Oct. 25, 1952          10 Sheets-Sheet 3
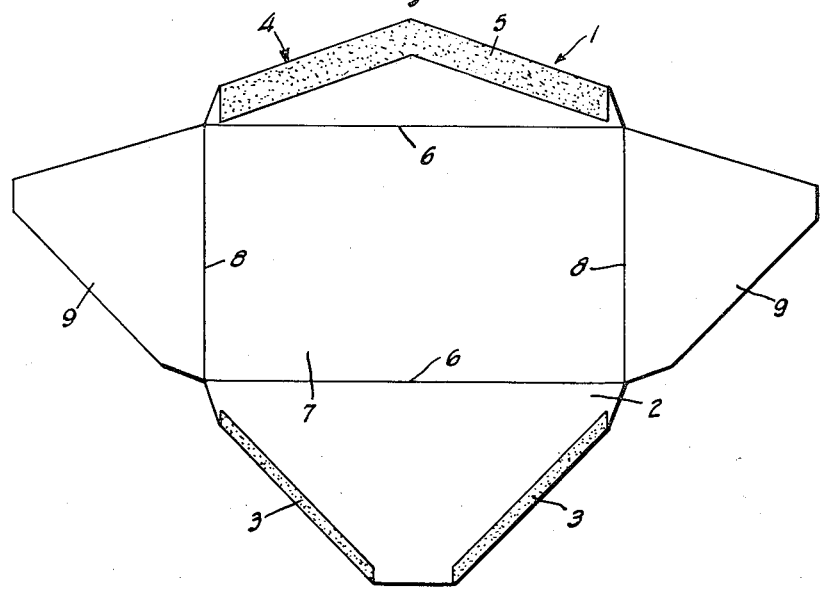
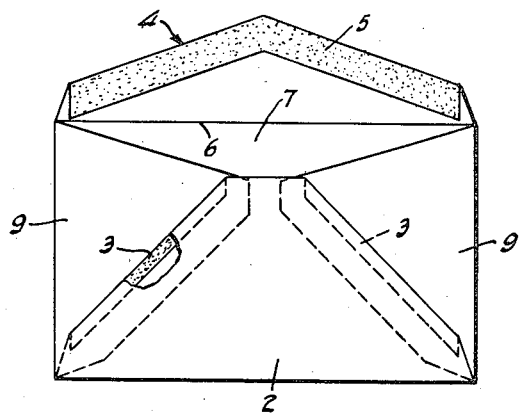
INVENTOR.
Abraham Novick
BY
Moses, Nolte, Crews & Berry
ATTORNEYS

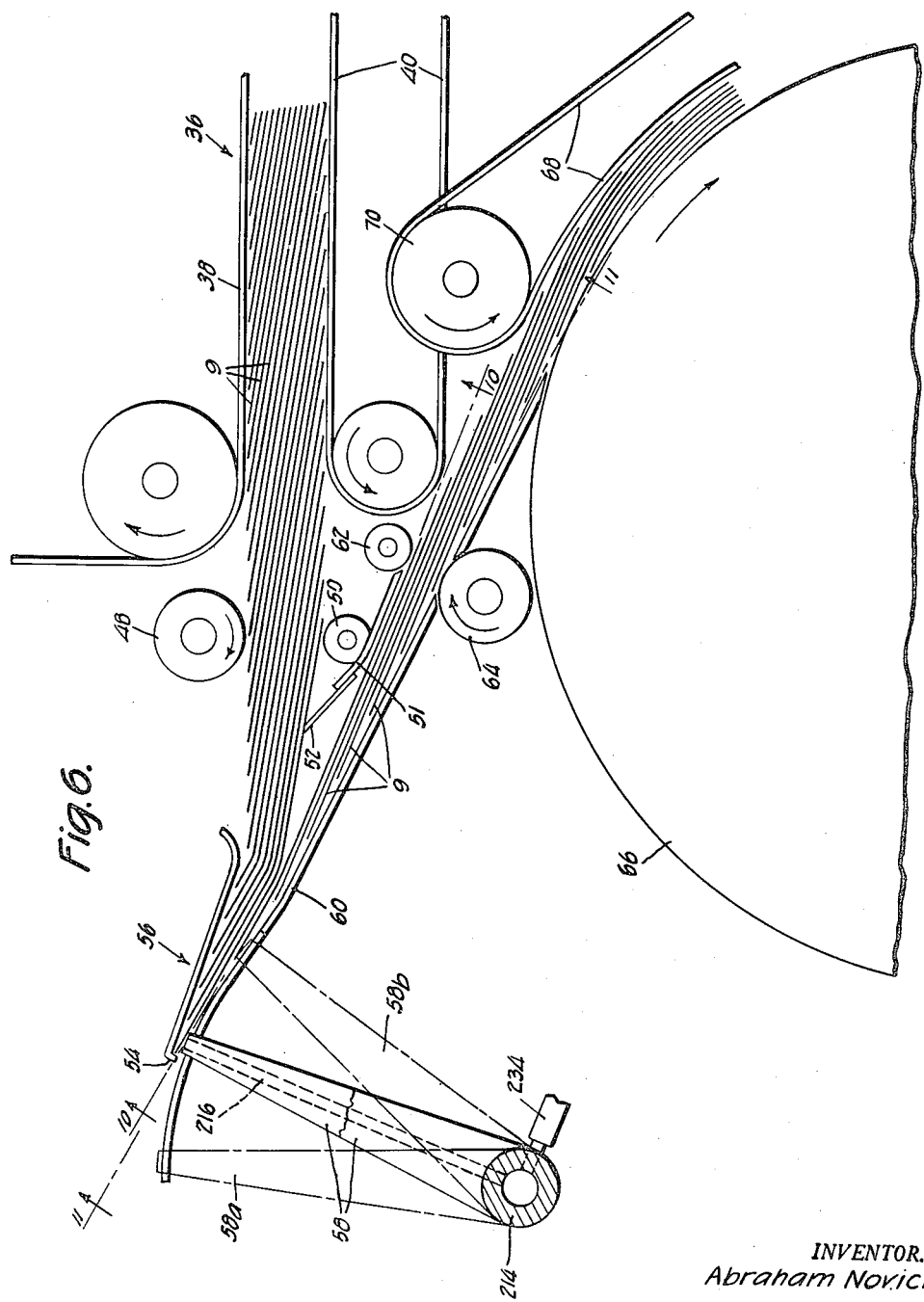

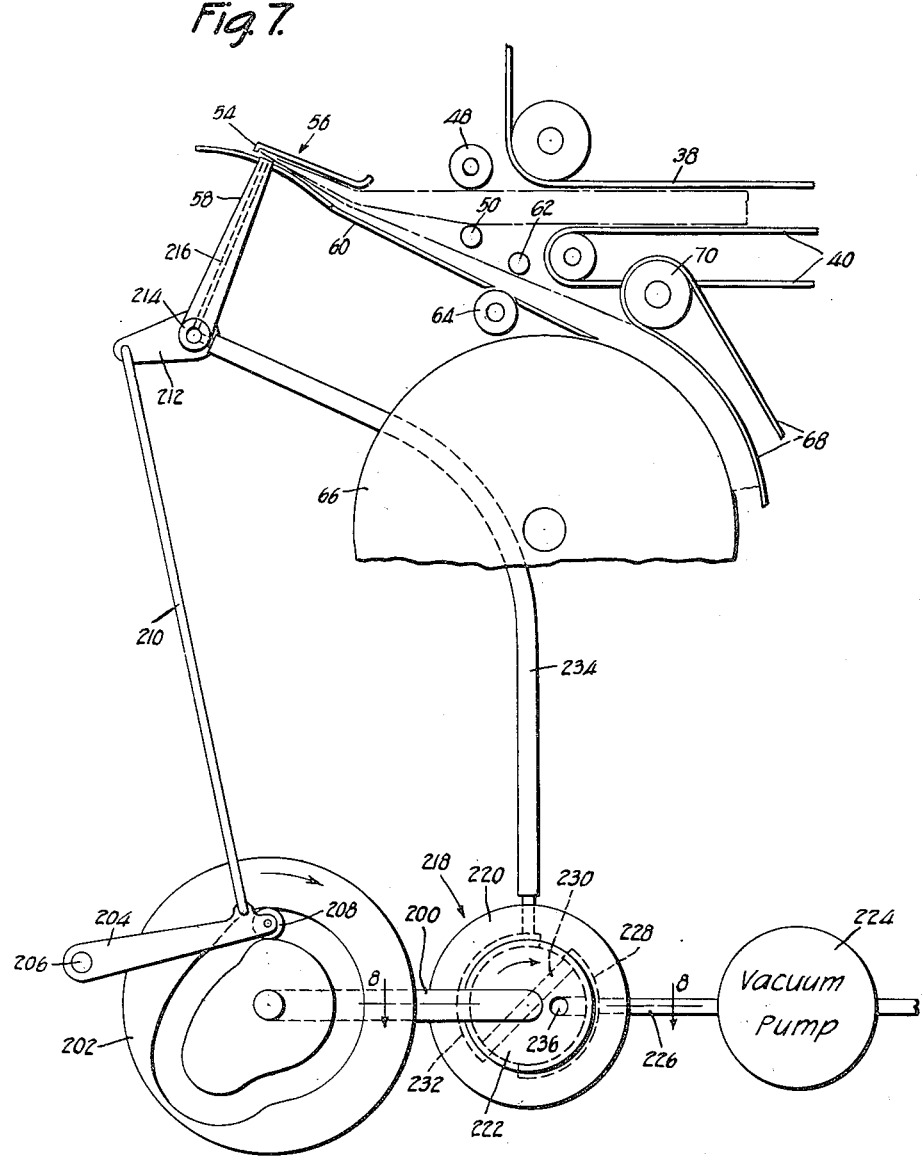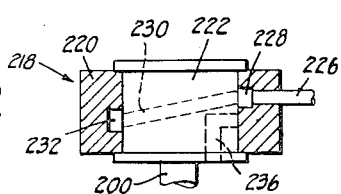

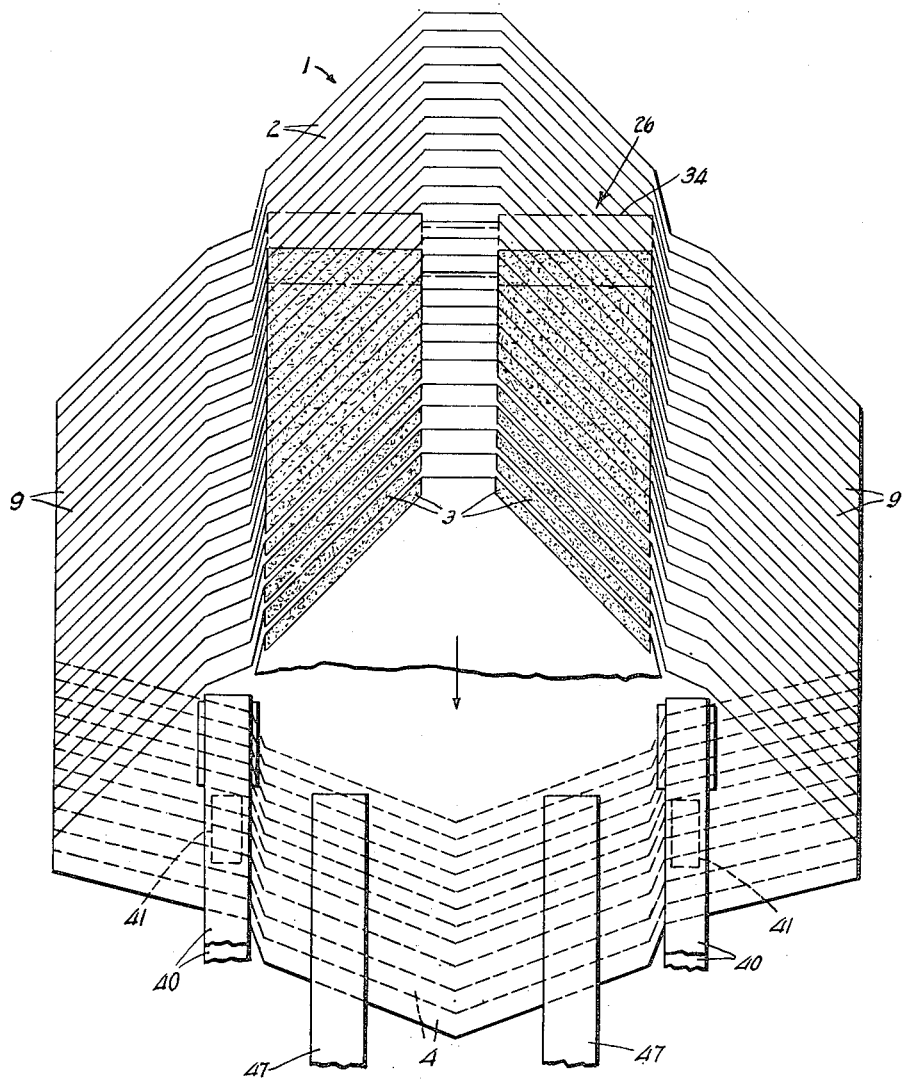

Nov. 13, 1956  A. NOVICK  2,770,176
METHOD AND APPARATUS FOR MAKING OPEN SIDE ENVELOPES
Filed Oct. 25, 1952  10 Sheets-Sheet 7

INVENTOR.
Abraham Novick
BY
Moses, Nolte, Crews & Berry
ATTORNEYS

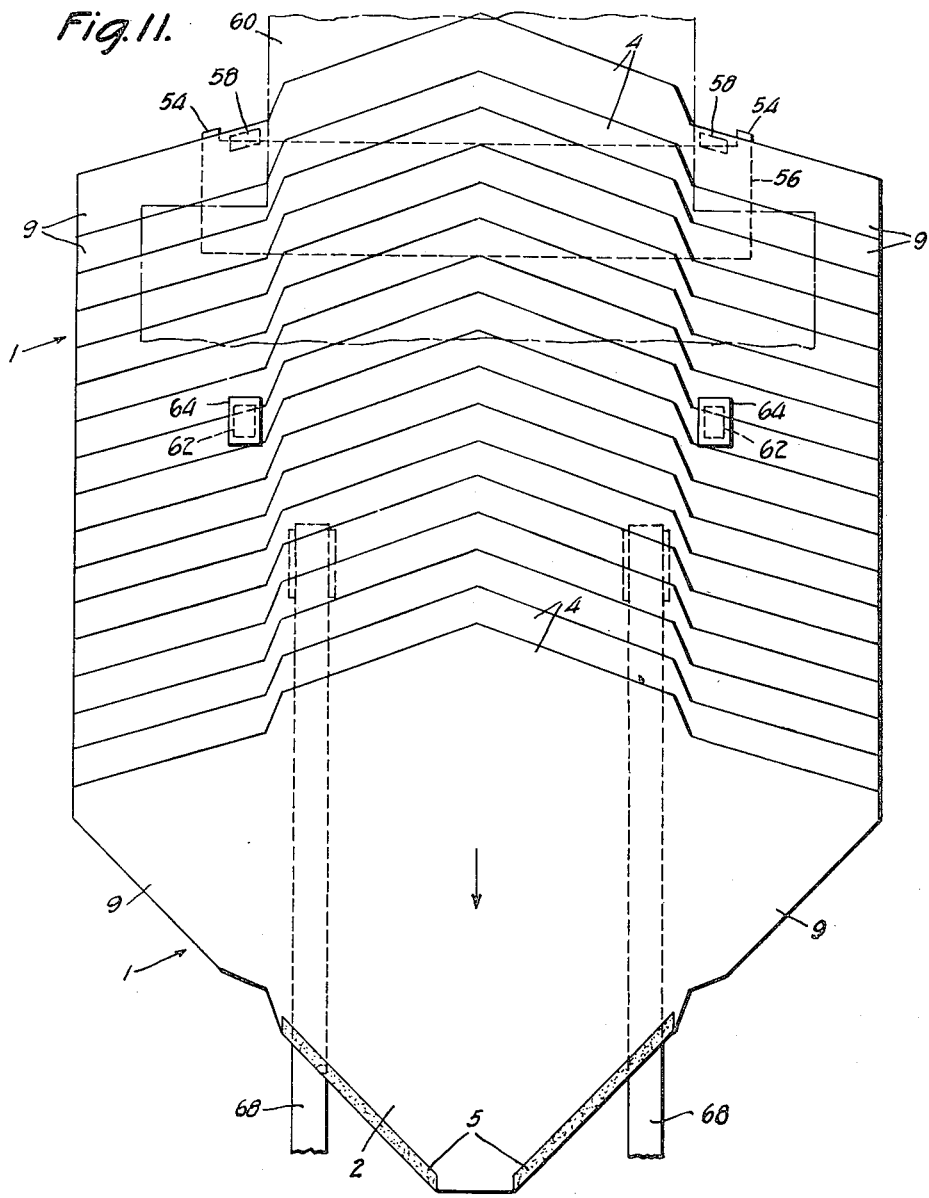

Nov. 13, 1956   A. NOVICK   2,770,176
METHOD AND APPARATUS FOR MAKING OPEN SIDE ENVELOPES
Filed Oct. 25, 1952   10 Sheets-Sheet 9
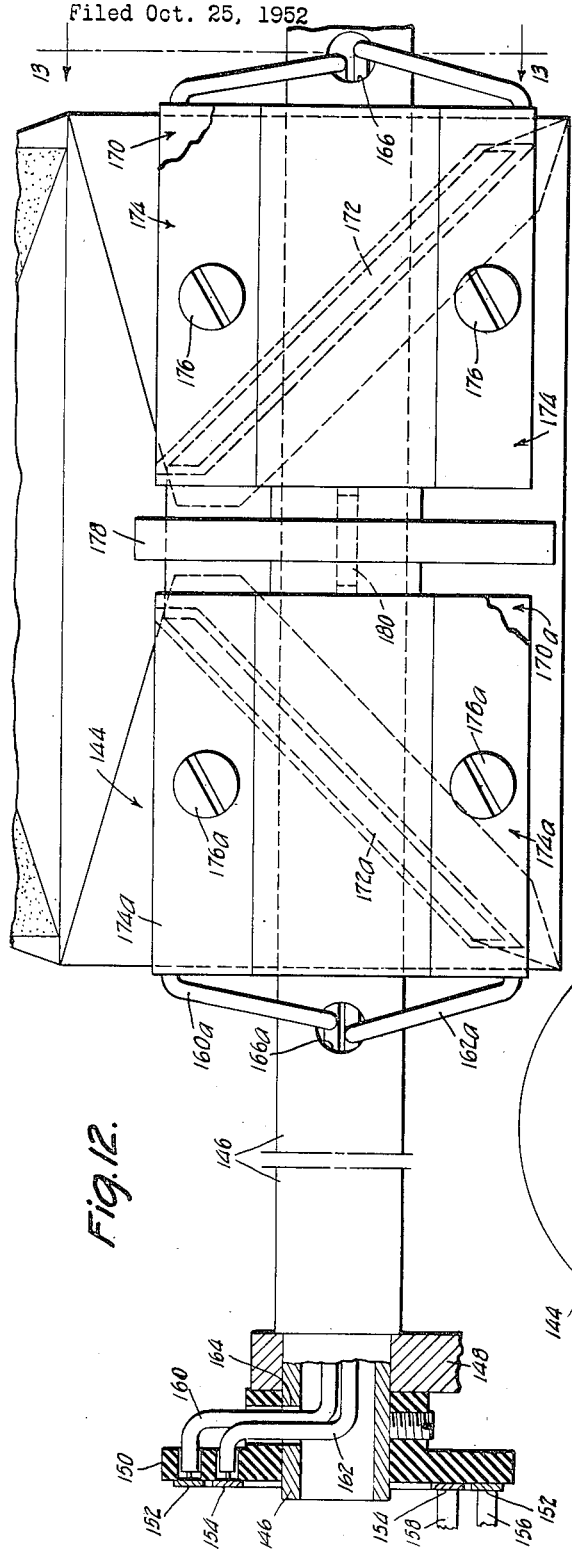
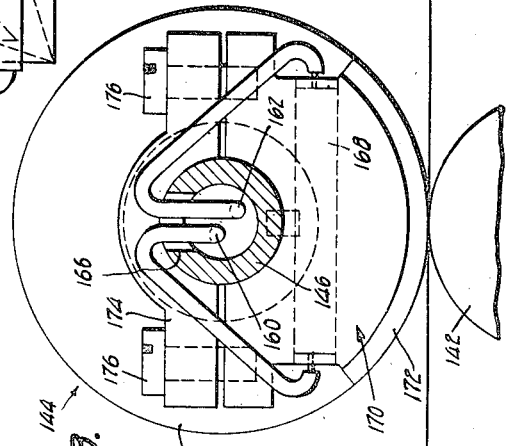
INVENTOR.
Abraham Novick
BY
Moses, Nolte, Crews & Berry
ATTORNEYS Nov. 13, 1956 A. NOVICK 2,770,176
METHOD AND APPARATUS FOR MAKING OPEN SIDE ENVELOPES
Filed Oct. 25, 1952 10 Sheets-Sheet 10

INVENTOR.
Abraham Novick
BY
Moses, Nolte, Crews + Berry,
ATTORNEYS

United States Patent Office 2,770,176
Patented Nov. 13, 1956

2,770,176

METHOD AND APPARATUS FOR MAKING OPEN SIDE ENVELOPES

Abraham Novick, Flushing, N. Y., assignor to F. L. Smithe Machine Co., Inc., New York, N. Y., a corporation of New York Application October 25, 1952, Serial No. 316,921

8 Claims. (Cl. 93—62)

This invention relates to envelope making machines, and more particularly to novel machines in which the bottom flap gum is applied by fan-out gumming. The application of bottom flap gum by fan-out gumming is believed to be broadly new.

The utilization of fan-out gumming for the bottom flaps permits the rate of envelope production by a machine to be increased. When a bottom flap die gummer is used upon individualized moving blanks, as has been customary, the gumming die must be made to run at a peripheral speed equal to the speed of the individualized blanks. Since the rate of blank feeding is proportional to the spacing between the leading edges of successive blanks, the individualized blanks run at comparatively high speed, and the peripheral speed of the die is correspondingly high. The tendency of a die to throw off gum by centrifugal action compels a limitation of die speed, and this, in turn, compels limitation of the rate of envelope feeding. Thus, the speed at which a gumming die may be operated has been the limiting factor or bottle-neck controlling the rate of envelope production of rotary machines. It is an important feature, therefore, that in the present machine the need for employing a die gummer is obviated.

When fan-out gumming is performed, the compactness of the fanned-out blanks is apt to be twenty times as great as the compactness of the individualized blanks which pass a die gummer, and hence the same number of blanks would pass the fan-out gummer in a given time at one-twentieth the speed at which the individualized blanks pass a die gummer. Since the bottom flap fan-out gum applying roller can be run without throwing gum at a peripheral speed much greater than one-twentieth of the permissible peripheral speed of a die gummer, the rate of envelope production is not limited by the bottom flap gumming operation as heretofore.

If the advantage of more rapid envelope production is to be realized in a machine for making first class envelopes, it is important that both the bottom flap and the seal flap be fan-out gummed. Since the bottom flap gum and the seal flap gum are applied to opposite margins of the lining face of each blank, it is necessary for the gum first applied to be dried, for the direction of blank overlap to be reversed, and for the direction of blank feeding to be reversed after the first gum has been applied, before the second gum can be applied.

In standard envelope making machinery such, for example, as that disclosed in Uunted States Patent No. 1,807,867, it is usual for the seal flap gum to be applied by fan-out gumming mechanism, and for the bottom flap gum to be applied by die gumming mechanism, the latter followed immediately by the bottom flap folding operation so that the folding may occur while the bottom flap gum is still moist.

The utilization of two fan-out gummers presents a problem. If the seal flap gum were to be applied first, that application would have to be followed by drying and by reversal of the blank overlap and of the direction of feeding. Then the bottom flap gum would have to be applied and dried with the bottom flap trailing and the blanks overlapped. Next the blanks would have to be again reversed in direction and individualized, and the bottom flap gum would have to be remoistened, prior to bottom flap folding. This would be awkward in that it would involve two reversals, the employment of two long fan-out dryers, and remoistening of the bottom flap gum prior to folding.

In accordance with the present invention, the procedure and the mechanism are greatly simplified by gumming the bottom flaps first, by employing heat sensitive gum for the bottom flaps, and by using heated rollers for pressing down the bottom flaps after they have been folded. With this arrangement the fanned-out blanks are started with the bottom flaps trailing, and the bottom flap gum is applied in a hot condition. Since heat sensitive gum sets much more quickly than water sensitive gum dries, a very short drying conveyor for this first gumming operation will suffice.

When the drying is completed the blanks are reversed in direction and arrangement to place the bottom flaps in advance, and the then trailing seal flaps are gummed in the normal way by fan-out gumming. From that point on, the manufacture of the blanks into finished envelopes is conventional, save that, instead of bottom flap gum having to be applied and used after individualization of the blanks, the previously applied bottom flap gum is utilized through the application of heat when pressing the bottom flaps against the side flaps. There is only one reversal of the envelope blanks involved in the entire procedure, and there is no remoistening of gum.

The use of heat sensitive gum, applied by the fan-out method, causes the gum to be applied right up to the edges of the bottom flaps. This enables narrower seams to be used. With die applied wet gum the gum must be kept away from the inner and outer edges or it will squeeze through. Therefore, wider seams are used to cover the gum and provide a margin of safety at the inside and at the outside of the envelope seams. With the heat applied gum it is only necessary to cover the gum at the inside to prevent sticking inside the envelope. For this reason, less seam material is needed. The paper saving represents an important economy because paper is the most expensive part of the envelope.

Other objects and advantages will hereinafter appear.

In the drawing forming part of this specification:

Figures 1, 2 and 3 are successive, complementary, views which show the operating mechanisms of an illustrative machine by which envelope blanks are converted into finished envelopes;

Figure 4 is a plan view of the lining face of a gummed and scored blank;

Figure 5 is a plan view showing the back of a finished envelope as made from the blank of Figure 4;

Figure 6 is a fragmentary view in side elevation upon a larger scale than Figures 1 to 3, showing turn around mechanism by which the fanned-out blanks are reversed in arrangement and in direction of feed;

Figure 7 is a view on a smaller scale than Figure 6, showing substantially the same mechanism together with operating and suction controlling mechanism for a suction arm which is employed at the turn around point;

Figure 8 is a fragmentary sectional detail view taken upon the line 8—8 of Figure 7, looking in the direction of the arrows;

Figure 9 is a view of the fanned-out pack, seen from the right of Figure 1 as it enters the bottom flap dryer;

Figure 11 is a view taken substantially along the line 11—11 of Figure 6, looking in the direction of the arrows;

Figure 12 is a fragmentary plan view, partly in section, of a gum heating and pressing roller by which the bottom flap gum is reactivated and pressed against the infolded side flaps of the blank;

Figure 13 is a fragmentary view in sectional elevation, the section being taken upon the line 13—13 of Figure 12, looking in the direction of the arrows;

Figure 1:
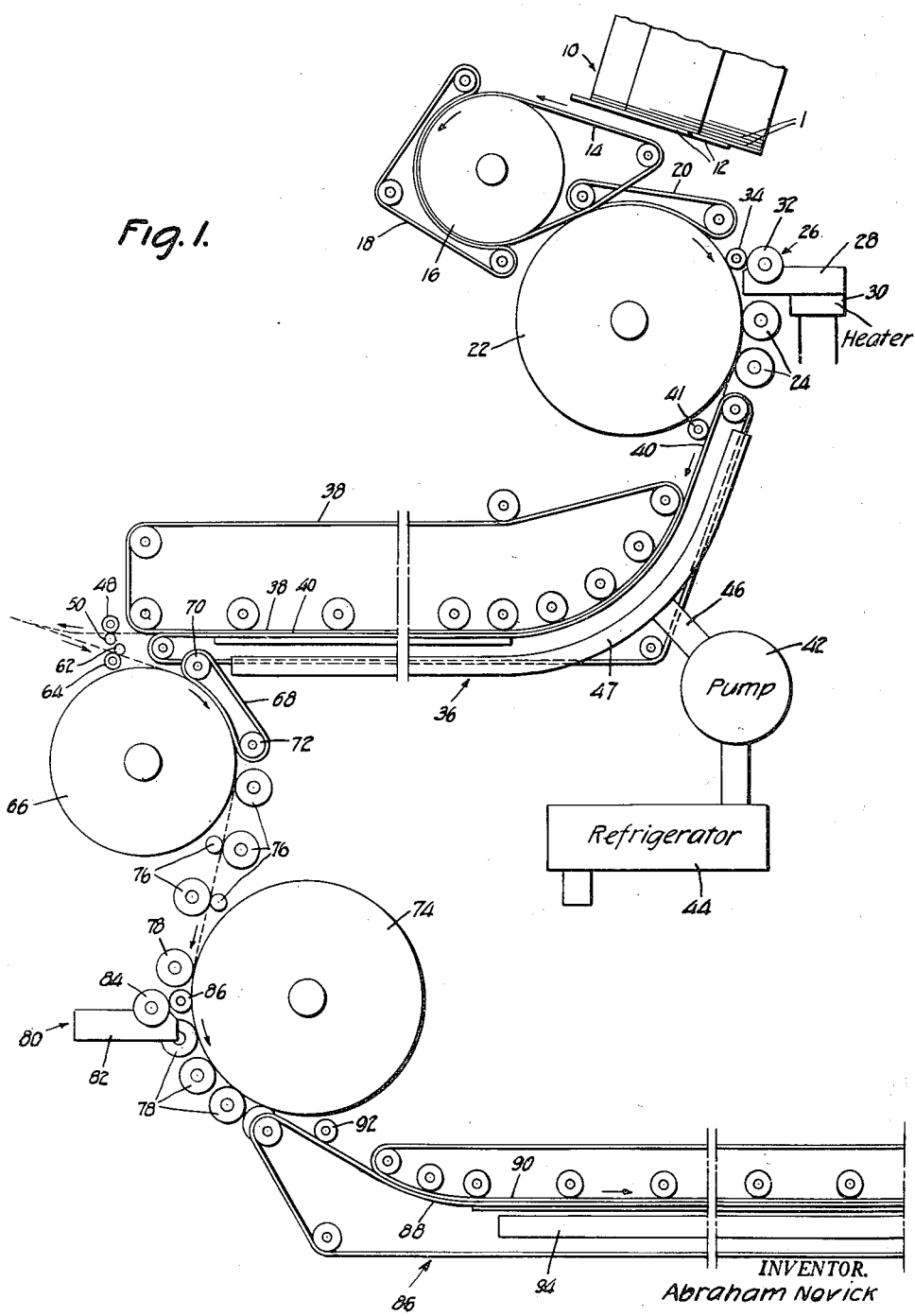
Figure 15:
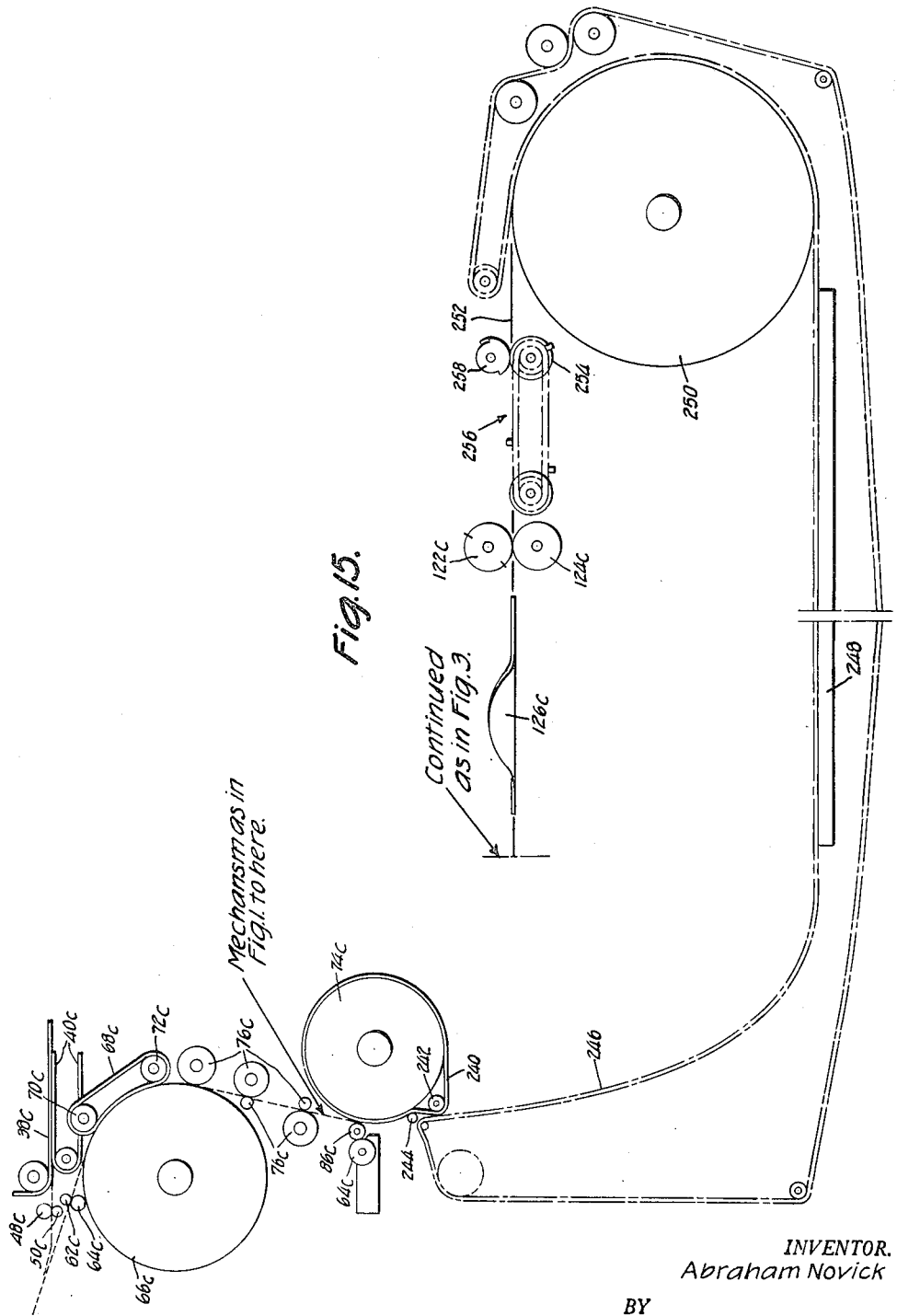

Figure 14 is a fragmentary view in side elevation showing a portion of the structure illustrated in Figure 12; and Figure 15 is a fragmentary view showing a modified seal flap dryer together with portions of the adjoining mechanism, the machine of Figure 15 being the same as that of Figures 1 to 3 with the exception of the seal flap dryer and the individualizing mechanism which follows the seal flap dryer.

For illustrative purposes, a machine is disclosed which is adapted to convert an envelope blank into the envelope illustrated in Figure 5. The blank is initially like the blank 1 of Figure 4, but without any score lines or gum. The blanks, as they are withdrawn from a stack, are first arranged in fan-out formation with the margins of the lining faces of the bottom flap 2 trailing. Gumming rollers of a fan-out gummer apply separate heat sensitive gum patches 3 to the oblique bottom flap margins. After drying of the heat sensitive gum, the blanks are reversed as to direction of feed and are rearranged with the seal flaps 4 trailing, and with the lining face margins of the seal flaps exposed for gumming. A fan-out gummer applies a gum patch 5 of moisture-sensitive adhesive to seal flap margin of each blank.

The blanks are again dried and are then individualized. They are next fed through scoring mechanism which makes transverse score lines 6 to divide the body 7 from the bottom and seal flaps 2 and 4 and longitudinal score lines 8 to divide the body from end flaps 9. The blanks are then advanced successively through end flap folding mechanism which folds the end flaps in against the lining face of the body, and through bottom flap folding mechanism which folds the bottom flap over onto the end flaps. After the latter folding, the blanks in their continued advance pass through pressing rollers which carry heated pressing ribs. The heat is applied through the ribs to the gum patches 3, causing these patches adhesively to unite the bottom flap with the respective end flaps. The patches 3 are spaced apart as shown in Figures 4 and 5, in order to avoid adhesion of the bottom flap to the lining face of the envelope body. Finally, the seal flap 4 is folded as usual against the back of the envelope and the finished envelopes are delivered on edge into an accumulating stack.

In the machine a stack 10 of envelope blanks 1 is supported upon rotary separator disc 12. The blanks are directly arranged into fanned-out relation on a conveyor belt 14 which runs upon a cylinder 16. The blanks are conducted between the belt 14 and opposed belt 18 beneath hold-down belts 20, and onto a cylinder 22. The cylinder 22, with the aid of hold-down rollers 24, advances the blanks in fanned-out relation past a fan-out gummer 26.

The mechanism for supporting the stack 10 and for separating the blanks from the stack 10 may be of well understood construction as disclosed, for example, in my co-pending application, Serial No. 275,053, filed March 6, 1952, for Blank Feeding Mechanism (now abandoned). The operation performed upon the blanks by this mechanism is normal except in one particular. Normally the stack is arranged so that the bottom flaps will lead as the blanks leave the stack. With that arrangement, the blanks are carried past the fan-out gummer with the seal flaps trailing and with the rear margin of each seal flap exposed to receive gum from the gummer. Since it is desired in the present instance, however, to apply gum first to the bottom flaps, the stack is turned around relative to the separator discs and the other separating mechanism, to cause the sealing flaps to lead and the bottom flaps to trail as the blanks leave the stack. The trailing bottom flaps have their margins exposed for gumming as they pass the gummer 26.

The gummer 26 applies heat sensitive adhesive rather than the conventional moisture sensitive adhesive. The gummer 26 is therefore made to include a gum box 28, a heater 30 for the gum box, a gum pick-up roller 32 which runs in the gum box, and a gum applying roller 34 which runs in engagement with the roller 32 and with the blanks. The roller 34 has a middle portion of reduced diameter (see Fig. 9) so that the gum is applied in two spaced stripes, to provide the spaced gum patches 3 on the individual blanks.

From the cylinder 22 the gummed blanks are advanced to a dryer 36 which may be generally like the dryer disclosed in my co-pending application, Serial No. 182,384, filed August 30, 1950, for Envelope Feeding Mechanism (now abandoned.) The dryer comprises opposed conveyor belts 38 and 40. The belts 38 and 40 run at slightly higher speed than the cylinder 22 so that each blank is pulled forward a short distance relative to the blanks which follow as it is taken over by the dryer conveyor. This pull-out is effected by belts 40 in cooperation with rollers 41, as illustrated in Figure 9. In the normal dryer hot dry air is blown onto the moisture sensitive adhesive on the blanks, but in the present dryer 36, because the gum is a hot, heat sensitive gum, cold air is blown against the gum on the blanks. Air is drawn in by a pump 42 (Fig. 1) through a refrigerator 44, and is delivered through conduits 46 to a pair of air chests or ducts 47 which are arranged side by side. The cold air escapes from the ducts 47 through numerous perforations and impinges against the gummed bottom flaps. The conveyor may be made much shorter than usual because the heat sensitive gum dries more quickly than moisture sensitive gum.

Figure 10:
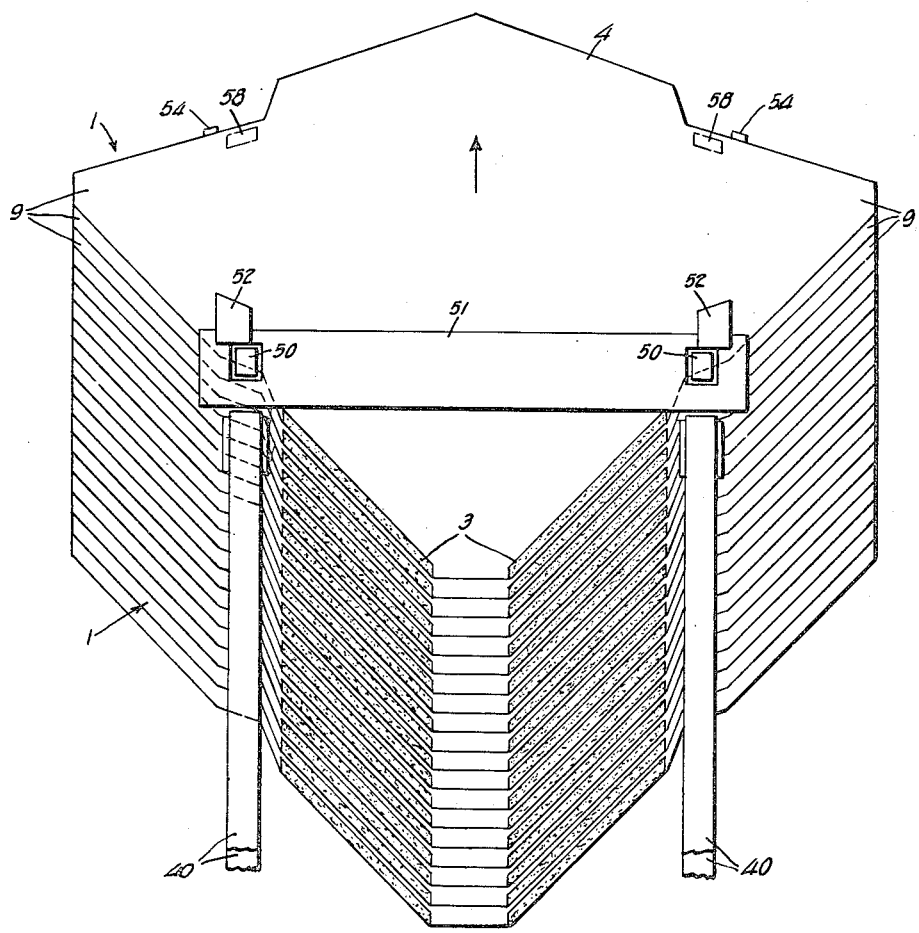
Figure 10 is a view taken substantially along the line 10—10 of Figure 6, looking in the direction of the arrows.

As the blanks emerge from the dryer 36 they are advanced between feed rollers 48 and 50, over a separator plate 51, Figures 6 and 10, having fingers 52, and against down turned lips 54 of a guiding and arresting plate 56, see Figure 11 also. As the leading edges of the end flaps of each blank reach the lips 54, reciprocating suction arms 58 seize the blank by leading margins of the end flaps, pull it clear of the lips 54, swing to the left to the broken line position designated 58a in Figure 6 to pull the trailing edge clear of the separator fingers 52, and then, while still adhering to the seized blank margin by suction, swing to the right to the broken line position designated 58b in Figure 6. At that point the suction is cut off, leaving the blank supported chiefly upon the blank which precedes it but at its extreme rear upon a supporting and guiding plate 60.

It will be observed that the arrangement of the fanned-out envelope band has been reversed by the arms 58 and that a reversal of the direction of feed of the blanks is started by the arm 58. Up to the plate 56 the lining faces of the bottom flap margins trailed and were exposed at the lower side of the band. As the blanks leave the plate 56, the lining faces of the seal flap margins trail and are exposed at the lower side of the band. The gummed margins of the bottom flaps now lead, as in Figures 6 and 9, and are located on top of the band, but still have their gummed faces turned downward so that the gummed faces of the seal flap margins are concealed.

The re-formed band is advanced by rollers 62 and 64 and a cylinder 66 at somewhat higher speed than that at which it was fed through the dryer 36. The band is held to the cylinder 66 by conveyor belts 68 which run upon rollers 70 and 72 (Fig. 1). As the blanks travel part way around the cylinder 66 the lining faces of the seal flap margins which are to be gummed, are faced toward the cylinder in an inaccessible location. The band of blanks, however, is delivered to an oppositely turning cylinder 74 by rollers 76. The cylinder 74, in cooperation with hold-down rollers 78, advances the blanks past a conventional fan-out gummer 80 by which moisture sensitive gum is applied to the exposed lining faces of the trailing seal flap margins. The gummer 80 comprises a gum box 82 in which a gum pick-up roller 84 runs. A gum applying roller 86 runs in engagement with the roller 84 and with the blanks themselves.

From the cylinder 74 the blanks are delivered to a dryer 86. The dryer and the individualizing mechanism which follows the dryer may be in all respects as shown and disclosed in Serial No. 182,384. Reference may be had to Serial No. 182,384 for a complete and detailed disclosure. There is a slight pull-out as the blanks enter the dryer, the dryer belts 88 and 90 and a roller 92 which cooperates with the lower belts 88 running at a speed slightly greater than that of the cylinder 74. As usual, hot air is supplied to a hot air chest 94 from which it is blown through numerous perforations onto the damp adhesive which has been applied to the seal flap margins.

The belts 88 and 90 travel around a cylinder 96 (Fig. 2) and discharge the band of blanks from between terminal rollers 98 and 100 across a short stationary table 102 which forms part of the individualizing mechanism disclosed in Serial No. 182,384. The blanks are fed by the belts 88 and 90 from the table 102 onto a support-and-holdback member 104 whose top is covered by a sheet 106 of soft rubber. A hollow shaft 108, disposed above the member 104, has fast upon it a feed disc 110 which runs substantially tangent to the upper frictional surface of the member 104 but is spaced slightly from it.

The disc 110 constitutes a feed roll. It is provided with radial suction passages 112, the passage extending from the hollow portion of the shaft 108 through the shaft wall, and thence through the body of the disc 110.

The disc 110 runs tangent to discs 114 and forms a feed bite with them, the disc 114 being made fast upon a shaft 116 which constitutes an end support for a pin conveyor 118. A suitable source of suction (not shown) is connected through valve mechanism (not shown) to control the suction timing. The suction is made effective with the disc 110 substantially in the position illustrated in Figure 2, and is broken when the blank has been caused to be gripped between the discs 110 and 114. A stripper plate 120 overlies the introductory end of the pin conveyor 118. The pin conveyor realigns and retimes the blanks in preparation for the operations which are to follow.

From the pin conveyor 118 the blanks pass between a pair of scoring rollers 122, 124 which are described in detail in United States Patent No. 1,839,491, the upper roller 122 including transverse scoring blades and circumferential scoring blades.

Blanks which have been fed to the scoring rollers 122, 124 in timed relation are fed therefrom through end flap folders 126 which consist of a pair of members resembling ploughshares, and thence to bottom flap folding mechanism 128 (Fig. 3) which consists of a pair of rollers 130, 132 running in contact and a pair of cooperating folding blades 134, 136. The blanks next pass between a pair of creasing and feeding rollers 138, 140, and are delivered into a bottom flap gum sensitizing and pressing mechanism which comprises a lower bed roller 142 and an upper die roller 144.

The die roller 144 is illustrated in detail in Figures 12 to 14. A hollow shaft 146 is rotatively supported in frame members 148 (one shown). At its left hand end, as seen in Figure 12, the shaft has fast upon it a disc 150 of insulating material. Spaced, concentric, conductive rings 152 and 154 are supported on the left face of the disc 150. Brushes 156 and 158, connected respectively to opposite terminals of a source of electrical potential (A. C. or D. C.), respectively engage the rings 152 and 154. Insulated conductors 160 and 162 lead from the respective rings, enter the hollow shaft 146 through an opening 164, and emerge from the shaft through an opening 166. The conductors 160 and 162 are connected to opposite ends of an electrical heating unit 168 which is lodged in a heating and pressing segment 170. Although the entire segment 170 is heated by the unit 168, only a raised spiral rib 172 presses against the bed roller 142 through the blanks. The rib 172 is disposed to bear against the outer face of the bottom flap directly over one of the gum patches 3. It sensitizes the gum and presses the gummed flap margin against the associated side flap. The segment 170 is held to the shaft 146 by a clamp plate 174 and headed screws 176, the screw shanks being passed freely through the clamp plate and threaded into the segment 170.

A second segment 170a of similar construction and having a rib 172a is similarly secured upon the shaft 146 by a clamping plate 174a and headed screws 176a. Branch conductors 160a and 162a emerge from the hollow shaft 146 through an opening 166a and are connected to the opposite ends of a heating unit 168a (Fig. 14) in the segment 170a. The two heating units are connected in parallel with one another through the connections described.

Between the segments 170 and 170a there is interposed a feed disc 178 which has its hub connected for rotation with the shaft 146 through a key 180. The disc 178 acts continuously along a central zone of each blank, which zone includes the ungummed space between the gum patches 3.

From the bottom flap gum activating and pressing mechanism the blanks are passed to top flap folding mechanism 182 which consists of a pair of feed rollers 184, 186 (Fig. 3) and cooperating folding members 188, 190, for reversing the travel of the envelopes and introducing the seal flap into the bight of feed rollers 192, 186. The last mentioned rollers feed the blanks between a pair of conveying belts 194, 196, whence they are delivered to a receiving section 198 where the blanks are stacked and counted.

In Figures 7 and 8 disclosure is made of the mechanism for operating the suction arms 58 and for controlling the suction timing. A constantly driven shaft 200 has fast upon it a track cam 202. A rocker arm 204 pivoted at 206 carries a follower roller 208 which is actuated by the cam 202. The arm 204 is connected through a link 210 with an arm 212 fast upon a hollow shaft 214. The shaft 214 also has fast upon it the two suction arms 58. The suction passages 216 through the arms 58 communicate with the interior of the shaft 214.

As the parts are seen in Figures 6 and 7, the arms 58 are standing in position to pick up the leading margin of the leading blank of the band which is traveling toward the stop lips 54. A concentric portion of the cam 202 of substantial angular extent has just traveled past the follower 208, and hence there is a substantial dwell of the arms in the position indicated. After the leading blank comes into contact with the lips 54, the concentric cam portion passes clear of the follower 208 and the follower is forced toward the center of the cam. This quickly rocks the arms 58 leftward to the position 58a of Figure 6, after which the follower is forced away from the center of the cam to carry the arms 58 to the position 58b of Figure 6. When the highest point of the cam has passed the follower, the arms 58 are returned to the full line position of Figure 6, this being the same as the Figure 7 position.

The suction control mechanism includes a valve 218 (Figs. 7 and 8) which comprises a stationary annular casing 220 and a rotary body 222 fast on the shaft 200, which body turns within the casing, being driven in unison with the cam 202. A vacuum pump 224 has its intake side connected through a conduit 226 with a segmental passage 228 formed in the casing 220. The passage 228 may communicate only with one end of a canted passage 230 which lies in a diametrical plane of the body 222. The passage 230 is adapted at times to place the passage 228 in communication with a segmental passage 232 which is formed in the casing 220 at the side opposite the passage 228. The passages 228 and 232 are not in a common plane, but are displaced axially of the casing 220. The passage 232 communicates constantly through a conduit 234 with the interior of the hollow shaft 214 and hence with the suction passages 216 of the arms 58.

As shown in Figure 7, the passage 230 has just moved into communication with the passages 228 and 232, placing the latter passages in communication with each other and the passages 216, of the arms 58, in communication with the source of suction. This causes the arms 58 to take control of the leading margin of the leading blank of the band of blanks which is approaching the lips 54. The suction is maintained effective while the arms 58 swing from the full line position of Figure 6 to the position 58a and then to the position 58b. As the arms 58 reach the latter position the passage 230 moves clear of the passages 228 and 232 so that the suction is cut off. At the same time an L-shaped passage 236 which is formed in the body 222 and which has one end constantly open to the atmosphere, moves into communication with the passage 232, admitting atmospheric air to the suction passages 216. In the position 58b, therefore, the arms 58 release the blank, and then return with the suction off to the Figure 7 position. One end of the passage 230 may communicate only with the passage 228 while the other end may communicate only with the passage 232. Communication between the passages 228 and 232 will not therefore be established twice per revolution, but only once per revolution, as intended. The passage 236 may be placed in communication with the passage 232 but not with the passage 228.

To recapitulate briefly, it will be seen that the mechanism as described is characterized by the following salient features of novelty:

(1) A fan-out gummer is provided in advance of all other operating instrumentalities for gumming the bottom flap margins, this gummer being adapted to apply heat sensitive adhesive and being followed by a comparatively short dryer which blows cold air on the blanks to hasten the cooling of the heat sensitive adhesive;

(2) A turn around mechanism is provided for re-forming and re-orienting the blanks as they come from one fan-out gummer and dryer in preparation for their presentation to another fan-out gummer and dryer, the turn around mechanism being itself of novel construction;

(3) After the turn around the procedure and apparatus are precisely the same as in conventional rotary machines of the prior art with the exception that in the conventional machine the sequence after side flap folding is (a) bottom flap gumming, and (b) bottom flap folding, whereas in the present machine it is (a) bottom flap folding and (b) bottom flap adhesive heating and pressing.

Because of these innovations, die gumming is completely eliminated and the speed limitation imposed by die gummers is removed. It is feasible, therefore, to run the machine at considerably higher speed than heretofore, with the result that the rate of envelope output can be greatly increased.

In Figure 15, a modified form of machine is disclosed. The mechanism is the same as that of Figures 1 to 3, 6 to 8 and 12 to 14, save that a different form of drying conveyor for the seal flap gum is utilized and a different form of individualizing mechanism following the dryer is utilized. Corresponding reference characters have been applied to corresponding parts with the subscript "c" added in each instance, and only the mechanism which differs from that of Figures 1 to 3, will be described.

The mechanism and the procedure involved in the machine of Figure 15 are the same as in Figure 1 down to the cylinder 74c, on which the band of blanks is carried past the gum applying roller 86c of the seal flap gummer. The adhesive applied by the roller 86c is moisture sensitive gum. In Figure 15 a conventional dryer transfer mechanism for transferring blanks from the gummer to the dryer, and conventional individualizing mechanism are provided of the kind disclosed in my United States Patent No. 1,807,867.

Belts 240 run in grooves upon the cylinder 74c upon a small roller 242, and beneath a guide roller 244. The belts 240 cooperate in delivering the blanks from the gumming mechanism to a drying conveyor 246 which comprises a pair of link chains with clips on alternate links thereof for clipping each blank positively to the conveyor. The blanks are conducted by the chains 246 past a hot air chest 248 from which hot air is blown on the blanks. The chain carries the band of blanks around a cylinder 250 and delivers the blanks across a table 252 onto a roller 254 which is co-axial with an end sprocket of a pin conveyor 256. A segment 258 driven at the same speed as the roller 254, cooperates with the roller 254 in pulling the blanks one after another quickly away from the fanned-out band.

The pin conveyor delivers the individualized blanks to scoring rollers 122c, 124c like the scoring rollers 122, 124 of Figure 2. The blanks travel thence past side flap folders 126c and through the instrumentalities of Figure 3 which have been already shown and described. It will be evident that the invention is not dependent upon a seal flap drying conveyor and individualizing mechanism of the type disclosed in Figures 1 and 2.

I have described what I believe to be the best embodiments of my invention. I do not wish, however, to be confined to the embodiments shown, but what I desire to cover by Letters Patent is set forth in the appended claims.

I claim:

1. The method of making open side envelopes which comprises withdrawing envelope blanks one after another from a stack of blanks and arranging the blanks in fanned-out relation with the bottom flaps trailing, advancing the fanned-out band of blanks continuously at low speed, applying hot, heat sensitive adhesive to the exposed lining faces of the bottom flap margins of the traveling fanned-out blanks at a gumming station, conducting the blanks in fanned-out formation away from the gumming station while cooling the applied adhesive to set it, reversing end for end the direction of feed and the fanned-out arrangement of blanks, fan-out gumming the sealing flaps, individualizing the blanks, advancing the individualized blanks at high speed, scoring and folding the side and bottom flaps, and hot pressing the gummed bottom flap margins of the traveling blanks to resensitize the adhesive on said margins and adhere such margins to the end flaps.

2. In a method of making open side envelopes, the procedure which comprises withdrawing envelope blanks one after another from a stack of blanks and arranging the blanks in fanned-out relation with the bottom flaps trailing, advancing the fanned-out band of blanks continuously at low speed, applying hot, heat sensitive adhesive to the exposed lining faces of the bottom flap margins of the traveling fanned-out blanks at a gumming station, setting the adhesive on said blanks, fan-out gumming the sealing flaps, individualizing the blanks, advancing each individualized blank at high speed, and re-heating the adhesive on the bottom flap of each individualized blank to re-sensitize it and pressing the adhesive coated bottom flap margin against the end flaps of the traveling blank to complete the envelope back.

3. The method of making open side envelopes which comprises withdrawing envelope blanks one after another from a stack of blanks and arranging the blanks in fanned-out relation with the bottom flaps trailing, advancing the fanned-out band of blanks continuously at low speed, applying hot, heat sensitive adhesive to the exposed lining faces of the bottom flap margins of the traveling fanned-out blanks at a gumming station, conducting the blanks in fanned-out formation away from the gumming station while cooling the applied adhesive to set it, reversing end for end the direction of feed and the fanned-out arrangement of blanks, so that the seal flap margins trail with their lining faces exposed, fan-out gumming the seal flaps, drying the seal flaps, individualizing the blanks, scoring and folding the end and bottom flaps, and hot pressing the gummed bottom flap margin of each blank to re-sensitize the adhesive on said margin and adhere it to the end flaps.

4. In an envelope making machine, in combination, means for gumming and drying fanned-out blanks and conducting them fanned-out in a first band to a turn around station, and mechanism at said station for rearranging the blanks into a second band in which the fanned-out arrangement is reversed and the direction of travel is reversed, comprising a stop toward which the fanned-out blanks of the first band are advanced, a support for the blanks of the first band approaching said stop, spaced from the stop far enough to be nearly cleared by the leading blank of said first band when said blank engages the stop at a pick-up point, a suction arm engageable with the leading margin of the leading blank at the pick-up point to draw it by suction clear of the stop, and means for oscillating the suction arm to impart a first motion to the blank in a direction to continue the previous travel of the leading edge of the leading blank beyond said stop and to pull the leading blank clear of said support, and then to impart a second motion in the opposite direction to thrust the blank to and beyond the pick-up point to a point of delivery, means for supporting the blanks during and after the action of the arm upon them, and means for conducting the blanks away from the point of delivery in rearranged fanned-out relation at uniform speed and in the direction of said second motion with the bottom flaps leading.

5. A structure as set forth in claim 4 in which a cam is provided for imparting motion to the suction arm, said cam constructed and arranged to cause the arm to dwell for a substantial period at the blank pick-up point.

6. A structure as set forth in claim 4 in which a cam is provided for imparting motion to the suction arm, said cam constructed and arranged to cause the arm to dwell for a substantial period at the blank pick-up point, and means for causing the suction to become effective at the conclusion of said dwell and to be cut off at the delivery point.

7. In an envelope making machine, in combination, means for arranging blanks in fanned-out formation with the lining faces of the bottom flaps trailing and exposed for gumming, fan-out gumming means for applying hot, heat sensitive gum at a gumming station to the exposed lining face margins of the bottom flaps, a dryer for conducting the blanks away from the gumming station in the same fanned-out formation, means for reversing the fanned-out relation of the blanks and end for end the direction of travel of them with the bottom flaps leading, means for applying seal flap gum to the exposed, lining face margins of the seal flaps, means for individualizing the blanks, means for scoring each blank, means for folding the end flaps, means for folding the bottom flap, means for feeding the blank continuously to, through and away from said scoring and folding means, and rotary mechanism for adhering the bottom and end flaps through resensitization of the adhesive applied for that purpose, consisting of means for hot pressing the gummed bottom flap margin of the traveling blank against the end flaps.

8. In an envelope making machine, in combination, means for arranging blanks in fanned-out formation, with the lining faces of the bottom flaps trailing and exposed for gumming, fan-out gumming means for applying hot, heat sensitive gum at a gumming station to the exposed margins of the bottom flaps, a dryer for conducting the blanks away from the gumming station in the same fanned-out formation, means for reversing the fanned-out relation of the blanks and end for end the direction of travel of them to place the seal flaps in the trailing position with the margins of their lining faces exposed, means for applying adhesive to the exposed margins of the lining faces of the seal flaps, means for drying the seal flap adhesive, means for individualizing the blanks, means for scoring each blank, means for folding the end flaps, means for folding the bottom flap of the blank, means for feeding the blank continuously to, through and away from said scoring and folding means, and mechanism for hot pressing the gummed bottom flap margin of the traveling blank to re-sensitize the gum and press it against the end flaps.

References Cited in the file of this patent

UNITED STATES PATENTS

| | | |
|---|---|---|
| 1,827,539 | Novick | Oct. 13, 1931 |
| 2,019,946 | Winkler et al. | Nov. 5, 1935 |
| 2,062,265 | Haskell | Nov. 24, 1936 |
| 2,087,605 | Novick | July 20, 1937 |
| 2,119,951 | Dunnebier | June 7, 1938 |
| 2,132,227 | Winkler et al. | Oct. 4, 1938 |
| 2,151,228 | Pflanze | Mar. 21, 1939 |
| 2,173,171 | Labombarde | Sept. 19, 1939 |
| 2,210,298 | Kroch et al. | Aug. 6, 1940 |
| 2,290,564 | Krueger | July 21, 1942 |